(12) United States Patent
Gowda et al.

(10) Patent No.: US 11,451,574 B2
(45) Date of Patent: Sep. 20, 2022

(54) DETECTING SECURITY THREATS IN STORAGE SYSTEMS USING ARTIFICIAL INTELLIGENCE TECHNIQUES

(71) Applicant: EMC IP Holding Company LLC, Hopkinton, MA (US)

(72) Inventors: Deepak Gowda, Cary, NC (US); Bina K. Thakkar, Cary, NC (US); Wenjin Liu, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 233 days.

(21) Appl. No.: 16/914,599

(22) Filed: Jun. 29, 2020

(65) Prior Publication Data

US 2021/0409435 A1    Dec. 30, 2021

(51) Int. Cl.
*H04L 9/00* (2022.01)
*H04L 9/40* (2022.01)
*G06N 20/00* (2019.01)
*G06N 3/02* (2006.01)

(52) U.S. Cl.
CPC .......... *H04L 63/1433* (2013.01); *G06N 3/02* (2013.01); *G06N 20/00* (2019.01); *H04L 63/1416* (2013.01); *H04L 63/1425* (2013.01); *H04L 63/20* (2013.01)

(58) Field of Classification Search
CPC ............. H04L 63/1433; H04L 63/1416; H04L 63/1425; G06N 20/00

USPC .......................................................... 726/23
See application file for complete search history.

(56) References Cited

U.S. PATENT DOCUMENTS

| | | | |
|---|---|---|---|
| 10,503,895 B2 | 12/2019 | Chen | |
| 10,586,052 B1 | 3/2020 | Marelas | |
| 10,970,395 B1 * | 4/2021 | Bansal | G06F 21/566 |
| 11,301,563 B2 * | 4/2022 | Huang | G06F 21/554 |
| 2019/0121978 A1 | 4/2019 | Kraemer et al. | |
| 2019/0138747 A1 | 5/2019 | Anderson et al. | |
| 2020/0267057 A1 * | 8/2020 | Garvey | H04L 41/142 |
| 2020/0364615 A1 * | 11/2020 | Sanchez | G06N 20/00 |

* cited by examiner

*Primary Examiner* — Christopher J Brown
(74) *Attorney, Agent, or Firm* — Ryan, Mason & Lewis, LLP (57) ABSTRACT

Methods, apparatus, and processor-readable storage media for detecting security threats in storage systems using AI techniques are provided herein. An example computer-implemented method includes obtaining historical performance data and historical capacity data pertaining to one or more storage objects within a storage system; determining supervised datasets pertaining to security threat-related data and non-security threat-related data by processing at least a portion of the obtained data using a first set of AI techniques; configuring a second set of AI techniques based at least in part on the determined supervised datasets; detecting one or more security threats in connection with at least one storage object within the storage system by processing input data from the at least one storage object using the second set of AI techniques; and performing at least one automated action based at least in part on the one or more detected security threats.

20 Claims, 7 Drawing Sheets

DETECTING SECURITY THREATS IN STORAGE SYSTEMS USING ARTIFICIAL INTELLIGENCE TECHNIQUES

FIELD

The field relates generally to information processing systems, and more particularly to techniques for providing security in such systems.

BACKGROUND

Security threats (e.g., cyber-attacks, etc.) present risks for systems (e.g., storage systems) and corresponding enterprises, wherein such risks can include the potential for data breaches. Conventional methods of security threat detection typically operate at the network layer and/or application layer, and such methods often lack sufficient granularity and result in slow or delayed threat detection.

SUMMARY

Illustrative embodiments of the disclosure provide techniques for detecting security threats in storage systems using artificial intelligence (AI) techniques. An exemplary computer-implemented method includes obtaining historical performance data and historical capacity data pertaining to one or more storage objects within at least one storage system, and determining supervised datasets pertaining to security threat-related data and non-security threat-related data by processing at least a portion of the obtained historical performance data and historical capacity data using a first set of one or more AI techniques. The method also includes configuring a second set of one or more AI techniques based at least in part on the determined supervised datasets, detecting one or more security threats in connection with at least one storage object within the at least one storage system by processing input data from the at least one storage object using the second set of one or more AI techniques, and performing at least one automated action based at least in part on the one or more detected security threats.

Illustrative embodiments can provide significant advantages relative to conventional security threat detection techniques. For example, problems associated with slow or delayed threat detection are overcome in one or more embodiments through detection of security threats at a storage object level using AI techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
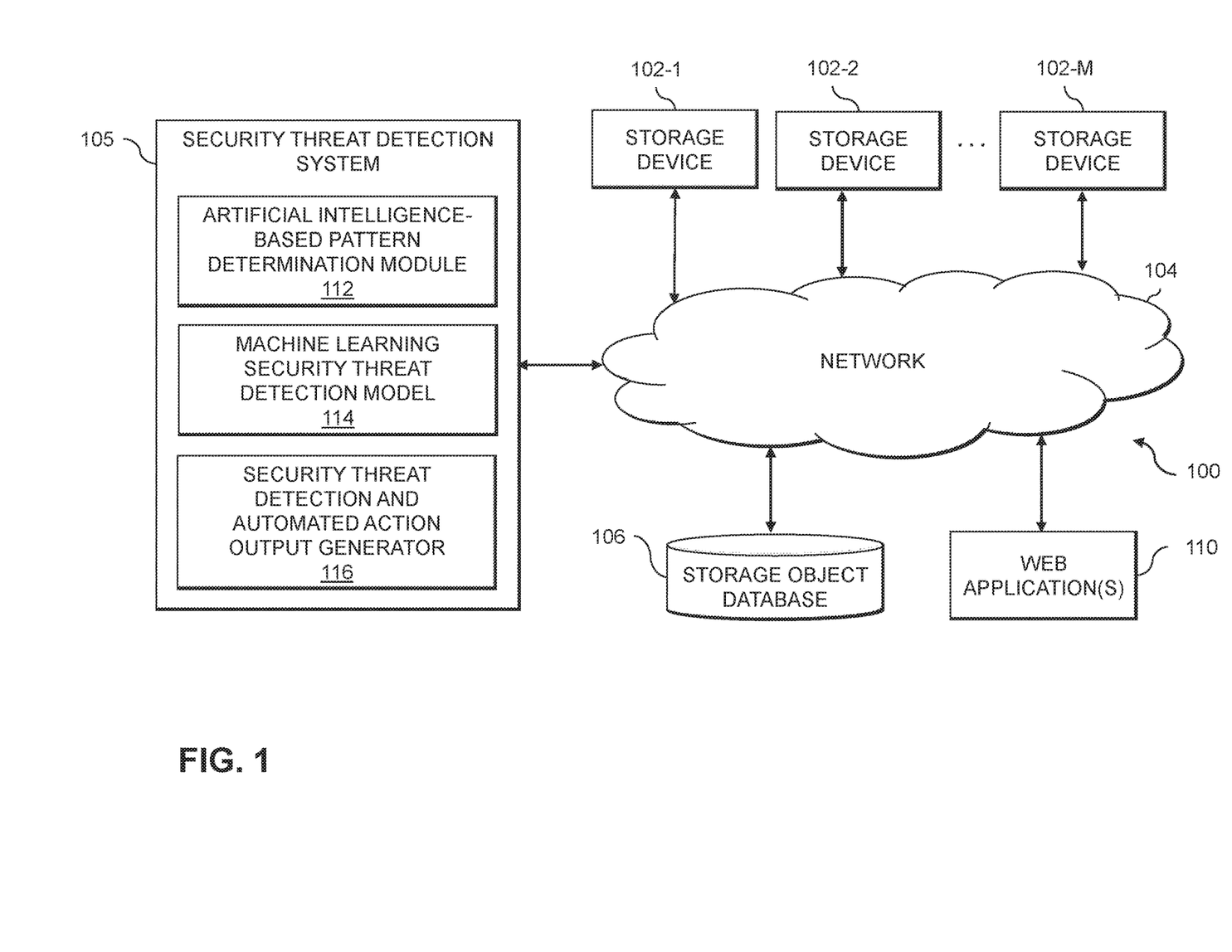
FIG. 1 shows an information processing system configured for detecting security threats in storage systems using AI techniques in an illustrative embodiment.

FIG. 1 shows a computer network (also referred to herein as an information processing system) 100 configured in accordance with an illustrative embodiment. The computer network 100 comprises a plurality of storage devices 102-1, 102-2, . . . 102-M, collectively referred to herein as storage devices 102. The storage devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is security threat detection system 105 and one or more web applications 110 (e.g., security monitoring applications, security remediation applications, etc.).

The storage devices 102 may comprise, for example, software-defined storage stacks. As used herein, a software-defined storage stack refers to software that abstracts data storage resources from an underlying physical storage hardware. In one or more embodiments, the storage devices 102 can also comprise storage clusters used in virtualized and cloud computing environments, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The storage devices 102 in some embodiments comprise respective devices associated with a particular company, organization or other enterprise of one or more users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the security threat detection system 105 can have an associated database 106 configured to store data pertaining to storage objects within one or more storage systems, which comprise, for example, storage object-level performance and capacity data such as latency data, input/output operations per second (IOPS) data, bandwidth data, central processing unit (CPU) utilization data, read percentage data, queue length data, etc., across one or more file systems, one or more logical unit numbers (LUNs), etc.

The database 106 in the present embodiment is implemented using one or more storage systems associated with security threat detection system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with security threat detection system 105 are one or more input-output devices, which illustratively comprise keyboards, displays or other types of input-output devices in any combination. Such input-output devices can be used, for example, to support one or more user interfaces to security threat detection system 105, as well as to support communication between security threat detection system 105 and other related systems and devices not explicitly shown.

Additionally, the security threat detection system 105 in the FIG. 1 embodiment is assumed to be implemented using at least one processing device. Each such processing device generally comprises at least one processor and an associated memory, and implements one or more functional modules for controlling certain features of the security threat detection system 105.

More particularly, security threat detection system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the security threat detection system 105 to communicate over the network 104 with the storage devices 102, and illustratively comprises one or more conventional transceivers.

The security threat detection system 105 further comprises an AI-based pattern determination module 112, a machine learning security threat detection model 114, and a security threat detection and automated action output generator 116.

It is to be appreciated that this particular arrangement of modules 112, 114 and 116 illustrated in the security threat detection system 105 of the FIG. 1 embodiment is presented by way of example only, and alternative arrangements can be used in other embodiments. For example, the functionality associated with modules 112, 114 and 116 in other embodiments can be combined into a single module, or separated across a larger number of modules. As another example, multiple distinct processors can be used to implement different ones of modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for security threat detection using AI techniques involving storage devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 112, 114 and 116 of an example security threat detection system 105 in computer network 100 will be described in more detail with reference to the flow diagram of FIG. 5.

Accordingly, at least one embodiment includes detecting security threats in storage systems using AI techniques. In an example embodiment, AI techniques (e.g., deep learning techniques) are implemented to detect specific forms of cyber-attacks leading to and/or related to data breaches. One or more embodiments include applying such techniques at storage layers such as LUNs and file systems to detect data breach patterns. As detailed herein, at least one embodiment includes learning temporally-relevant data trends (e.g., seasonality trends) in connection with generating one or more machine learning models. Such an embodiment can also include incorporating a closed-loop feedback mechanism to reduce false positive detections.

Figure 2:
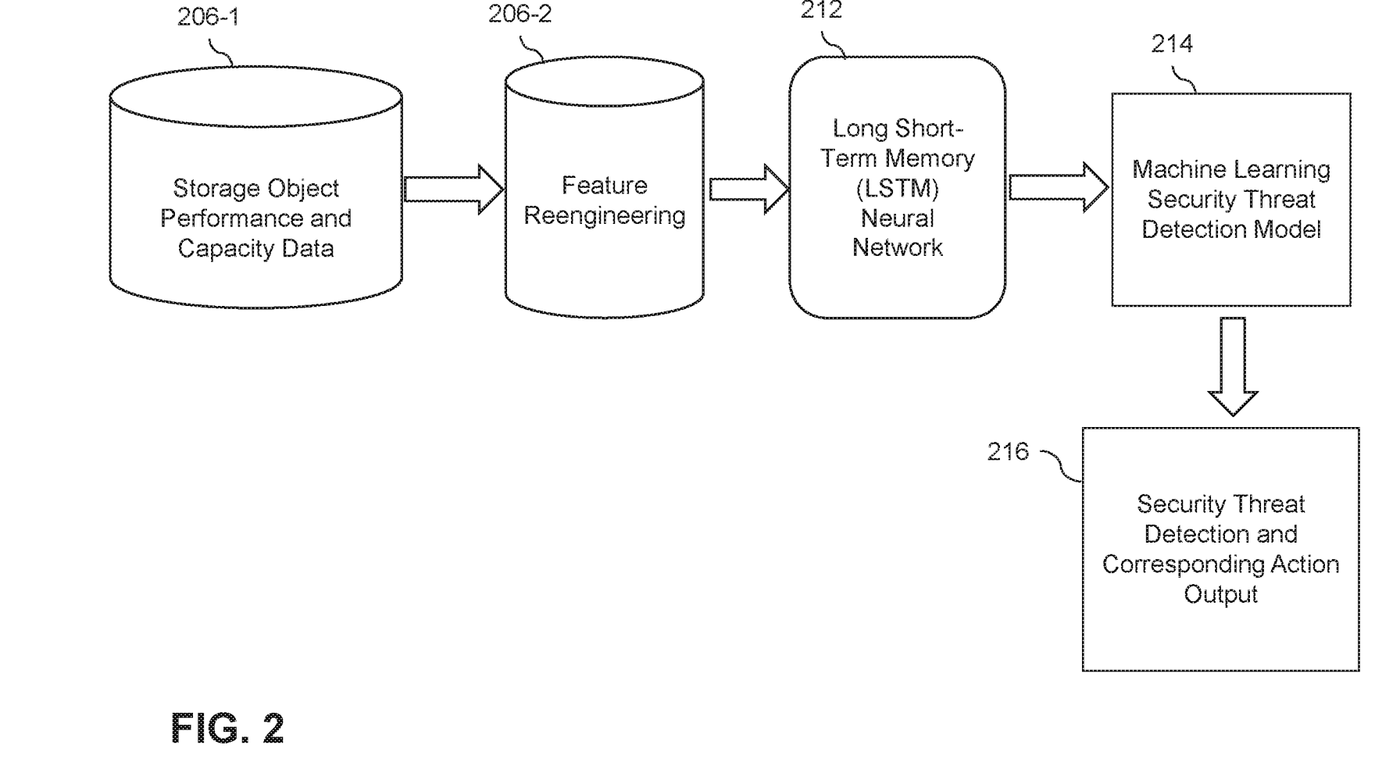
FIG. 2 shows an example solution architecture and workflow of an illustrative embodiment.

FIG. 2 shows an example solution architecture and workflow of an illustrative embodiment. By way of illustration, FIG. 2 depicts a database 206-1 containing storage object performance and capacity data, wherein such data are feature reengineered and subsequently stored in database 206-2. At least one embodiment includes storing, in database 206-1, lifetime performance data (e.g., TOPS data, latency data, CPU utilization data, etc.) and capacity data from storage system levels such as file systems and LUNs. Such data are then processed via one or more feature reengineering processes (e.g., converting values into a common scale, etc.) and stored in database 206-2.

As also depicted in FIG. 2, such processed data can then be provided to and processed by a LSTM neural network 212, which determines data patterns for each storage object derived from one or more determined data seasonality trends (e.g., monthly data trends, weekly data trends, daily data trends, hourly data trends, etc.). In one or more embodiments, using multivariate analysis, data bounds (i.e., lower bounds and upper bounds) for one or more data variables are derived by the LSTM neural network 212 for normal or non-security threat-related scenarios. Based at least in part on the determination of such bounds for normal or non-security threat-related scenarios, one or more security threat data zones are derived and/or determined by the LSTM neural network 212.

Using the normal and security threat zone data, supervised datasets are created and used to generate a machine learning security threat detection model 214 using one or more deep learning techniques. In one or more embodiments, the deep learning techniques used in generating a machine learning security threat detection model include a recurrent neural network. Accordingly, in such an embodiment, generating the machine learning security threat detection model can include the following steps. Using lifetime performance data from one or more storage arrays that have not been subjected to any of one or more security threats, supervised datasets with a label of "Non-Threat" are created. Also, using simulation techniques in connection with data from storage arrays that have been subjected to any of the one or more security threats, supervised datasets with a label of "Threat" are created. The created supervised datasets can then be shuffled, and features therein scaled and normalized. To reduce any imbalance in the datasets (for example, if the percentage of data with a "threat" label is low), at least one sampling method is used to create balanced datasets. Further, in an example embodiment, one or more of the features derived from and/or contained within the supervised datasets are engineered before being fed to the machine learning algorithm. Deep learning techniques such as, for example, a recurrent neural network can be implemented to understand the various threat and non-threat patterns associated with the supervised datasets, based at least in part on the number of layers in the recurrent neural network. Accordingly, the term "supervised datasets," as used herein, refers to datasets used in supervised machine learning environments.

Additionally, as depicted in FIG. 2, real-time performance and capacity data (derived from one or more storage objects of a storage system) are evaluated by the machine learning security threat detection model 214 to detect one or more data patterns therein. If at least one such detected pattern matches a security threat-related pattern (as determined via the machine learning security threat detection model 214), a security threat detection output 216 is generated in conjunction with one or more automated actions, such as generating and sending an alert to one or more entities associated with the storage system and/or a security remediation system. In at least one embodiment, a security threat detection output 216 can include a binary classification of security threat or no security threat based on whether the corresponding detected data pattern falls within a security threat zone or a normal zone. Further, in one or more example embodiments, the machine learning security threat detection model 214 can be applied to input data in real-time and/or every time an action (e.g., a read operation, a write operation, a delete operation, etc.) is carried out on the storage system in question.

Figure 3:
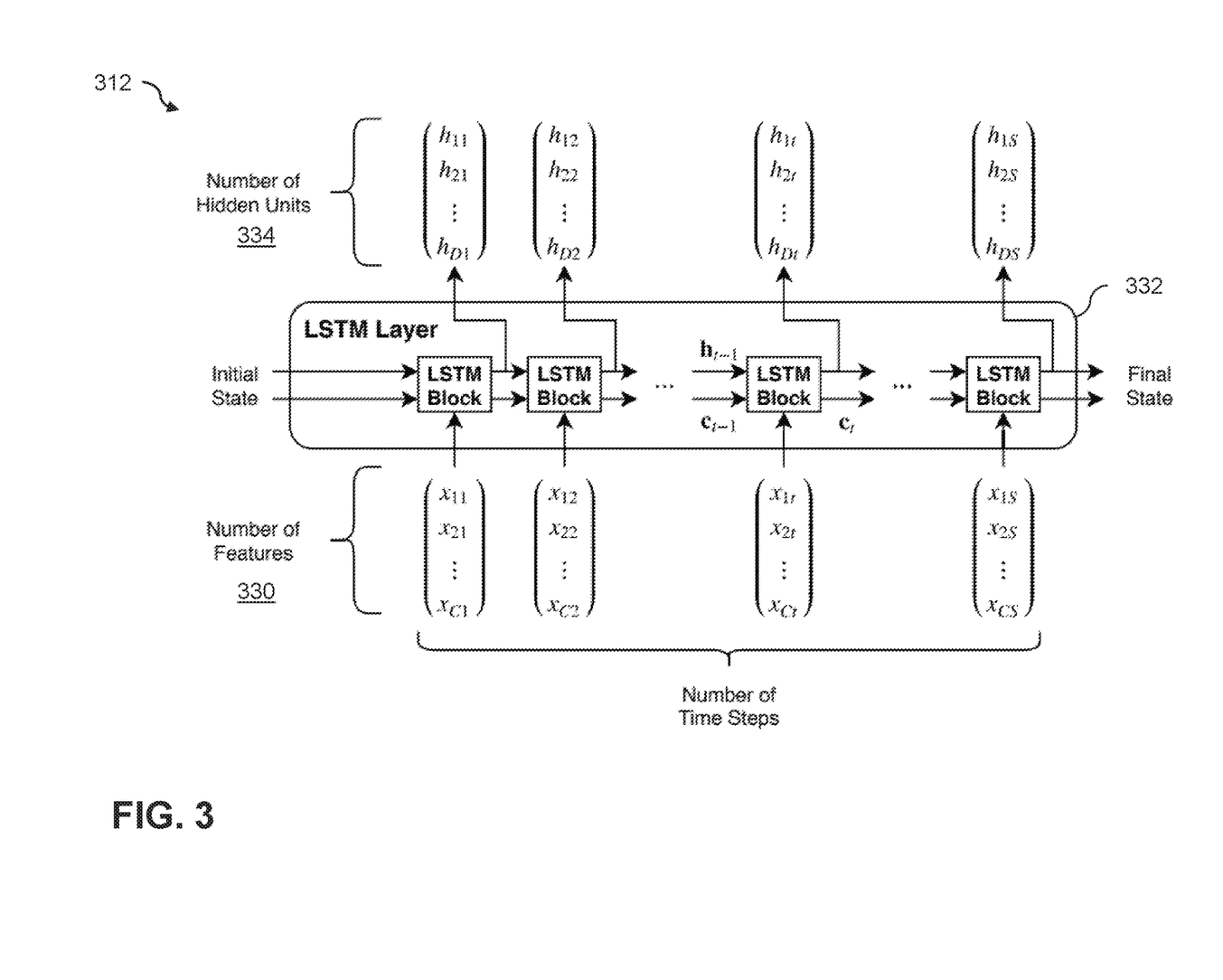
FIG. 3 shows a long short-term memory (LSTM) neural network in an illustrative embodiment.

FIG. 3 shows a LSTM neural network in an illustrative embodiment. By way of illustration, FIG. 3 depicts LSTM neural network 312 which includes features 330, an LSTM layer 332, and hidden units 334. As depicted in FIG. 3, the LSTM layer 332 includes one or more cell states and one or more gates. A cell state acts as a transport highway that transfers relative information down the sequence chain (serving, effectively as the memory of the network), carrying relevant information throughout the processing of the sequence. As such, information from earlier time steps can proceed to later time steps, reducing the effects of short-term memory. As the cell state proceeds through the LSTM layer 332, information is added and/or removed to the cell state via one or more gates. In one or more embodiments, such gates include different neural networks that decide which information is allowed on the cell state. The gates, in such embodiments, can learn what information is relevant to keep or forget during at least one training phase.

Figure 4:
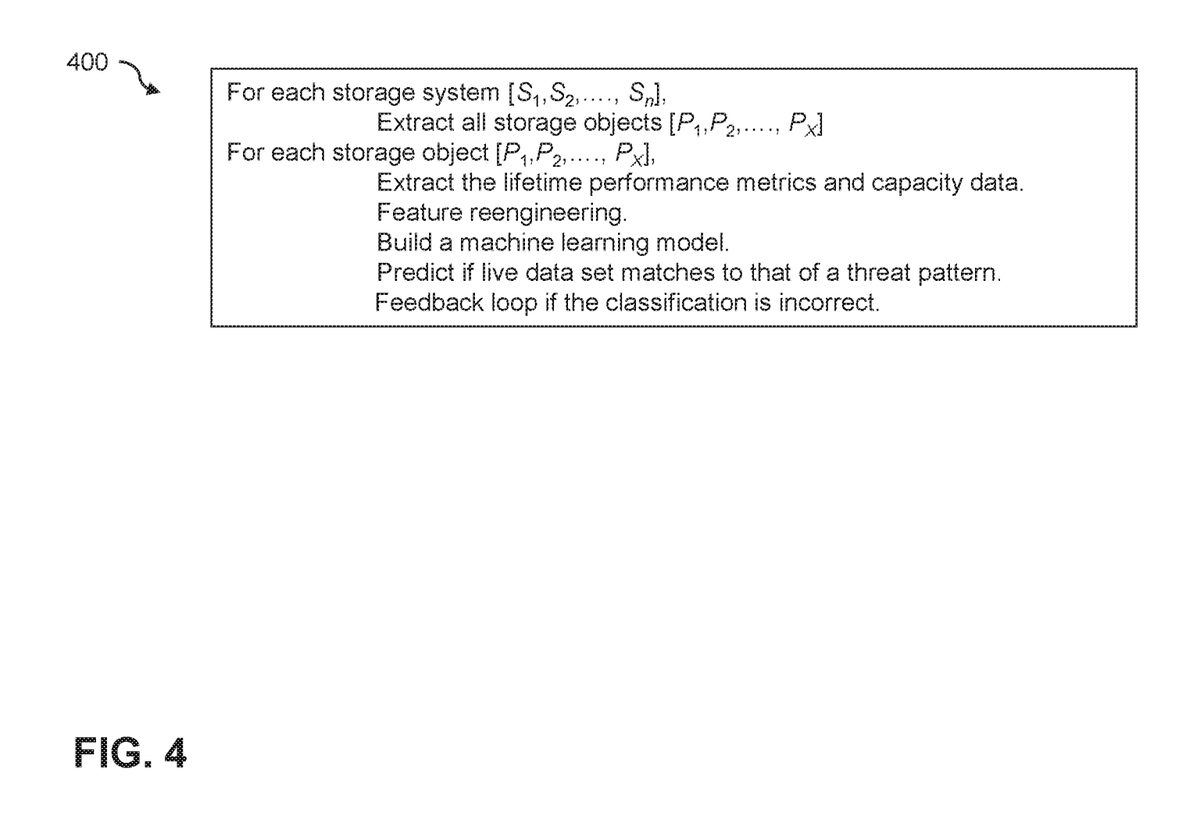
FIG. 4 shows example pseudocode for detecting security threats in storage systems using AI techniques in an illustrative embodiment.

FIG. 4 shows example pseudocode for detecting security threats in storage systems using AI techniques in an illustrative embodiment. In this embodiment, example pseudocode 400 is executed by or under the control of at least one processing system and/or device. For example, the example pseudocode 400 may be viewed as comprising a portion of a software implementation of at least part of security threat detection system 105 of the FIG. 1 embodiment.

The example pseudocode 400 illustrates a step of extracting, for each storage system $[S_1, S_2, \ldots, S_n]$, all storage objects $[P_1, P_2, \ldots, P_X]$ contained therein. Additionally, example pseudocode 400 illustrates a step of extracting, for each extracted storage object $[P_1, P_2, \ldots, P_X]$, lifetime performance metrics and capacity data. Example pseudocode 400 also illustrates steps of feature reengineering of the extracted performance metrics and capacity data, building a machine learning security threat detection model using the reengineered performance metrics and capacity data, and using the machine learning model to predict and/or determine if a live and/or real-time input dataset matches one or more security threat patterns. Further, example pseudocode 400 additionally illustrates a step of implementing a feedback loop if the prediction and/or classification is incorrect.

It is to be appreciated that this particular example pseudocode shows just one example implementation of an AI-based security threat detection technique, and alternative implementations of the process can be used in other embodiments.

Figure 5:
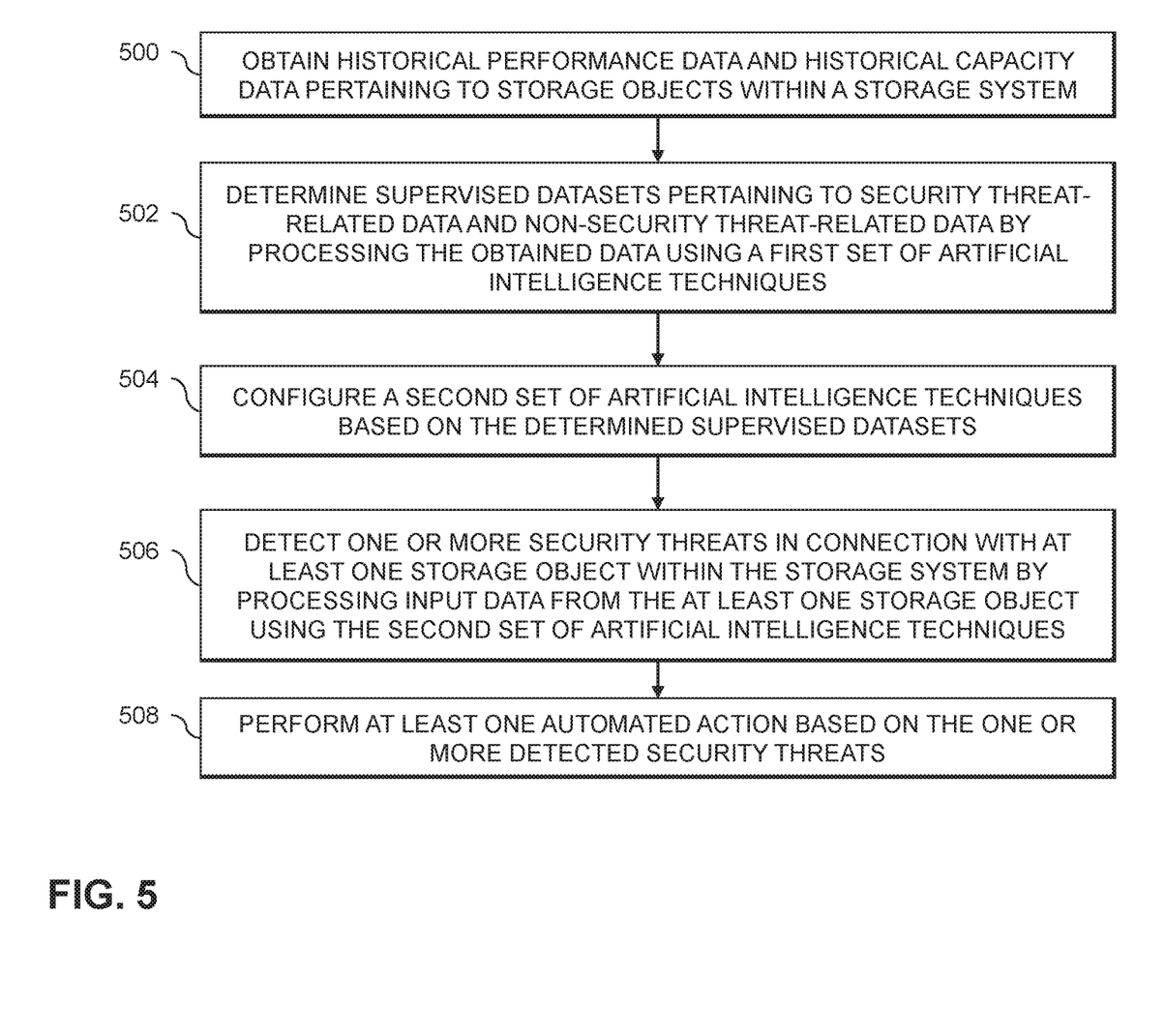
FIG. 5 is a flow diagram of a process for detecting security threats in storage systems using AI techniques in an illustrative embodiment.

FIG. 5 is a flow diagram of a process for detecting security threats in storage systems using AI techniques in an illustrative embodiment. It is to be understood that this particular process is only an example, and additional or alternative processes can be carried out in other embodiments.

In this embodiment, the process includes steps 500 through 508. These steps are assumed to be performed by the security threat detection system 105 utilizing its modules 112, 114 and 116.

Step 500 includes obtaining historical performance data and historical capacity data pertaining to one or more storage objects within at least one storage system. In one or more embodiments, the one or more storage objects include at least one file system within the at least one storage system and/or at least one logical unit number within the at least one storage system. Also, the historical performance data can include, for example, data related to latency, IOPS, bandwidth, CPU utilization, read percentage, queue length, etc.

Step 502 includes determining supervised datasets pertaining to security threat-related data and non-security threat-related data by processing at least a portion of the obtained historical performance data and historical capacity data using a first set of one or more AI techniques. In at least one embodiment, the first set of one or more AI techniques includes at least one long short-term memory neural network comprising one or more hidden units, wherein determining the supervised datasets includes determining one or more temporal-based patterns in the at least a portion of the obtained historical performance data and historical capacity data by performing multivariate analysis using the at least one long short-term memory neural network. In such an embodiment, determining the one or more temporal-based patterns includes determining, for each of one or more metrics within the at least a portion of the obtained historical performance data and historical capacity data, an upper bound value for non-security threat-related data and a lower bound value for non-security threat-related data.

Step 504 includes configuring a second set of one or more AI techniques based at least in part on the determined supervised datasets. Step 506 includes detecting one or more security threats in connection with at least one storage object within the at least one storage system by processing input data from the at least one storage object using the second set of one or more AI techniques. In at least one embodiment, the second set of one or more AI techniques includes a machine learning model which uses at least one deep learning technique comprising a recurrent neural network, and wherein configuring the second set of one or more artificial intelligence techniques includes learning one or more threat-related patterns in the determined supervised datasets based at least in part on a number of layers in the recurrent neural network. Also, the input data can include, for example, real-time performance data and real-time capacity data from the at least one storage object.

Step 508 includes performing at least one automated action based at least in part on the one or more detected security threats. In one or more embodiments, performing the at least one automated action includes generating and outputting an alert regarding the one or more detected security threats to at least one entity associated with the at least one storage system and/or training the second set of one or more AI techniques using at least a portion of the one or more detected security threats.

Additionally or alternatively, the techniques depicted in FIG. 5 can also include implementing a closed-loop feedback mechanism responsive to one or more conditions related to at least a portion of the one or more detected security threats.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to detect security threats in storage systems using AI techniques. These and other embodiments can effectively overcome problems associated with slow or delayed threat detection.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
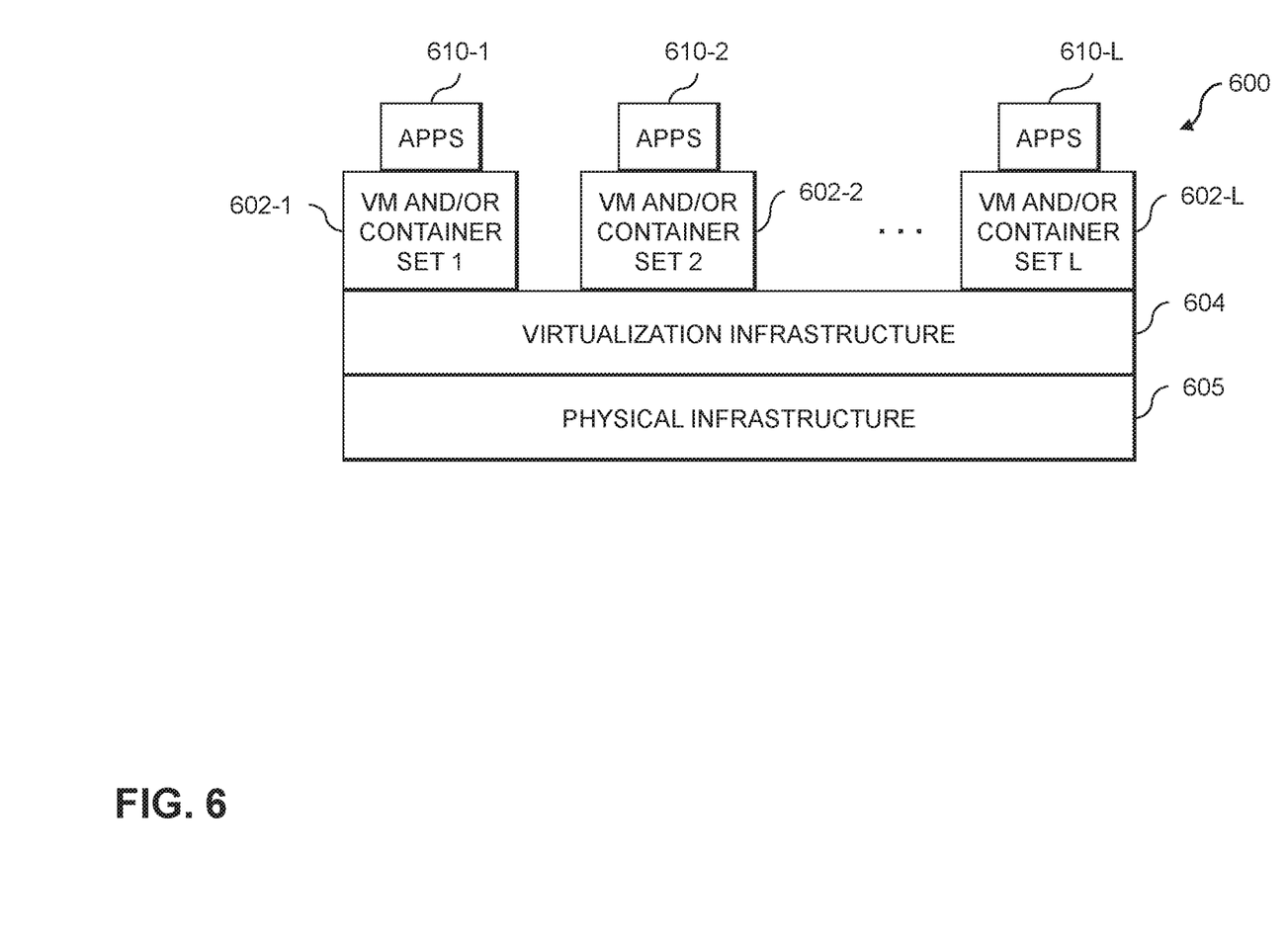
FIGS. 6 and 7 show examples of processing platforms that may be utilized to implement at least a portion of an information processing system in illustrative embodiments.
Figure 7:
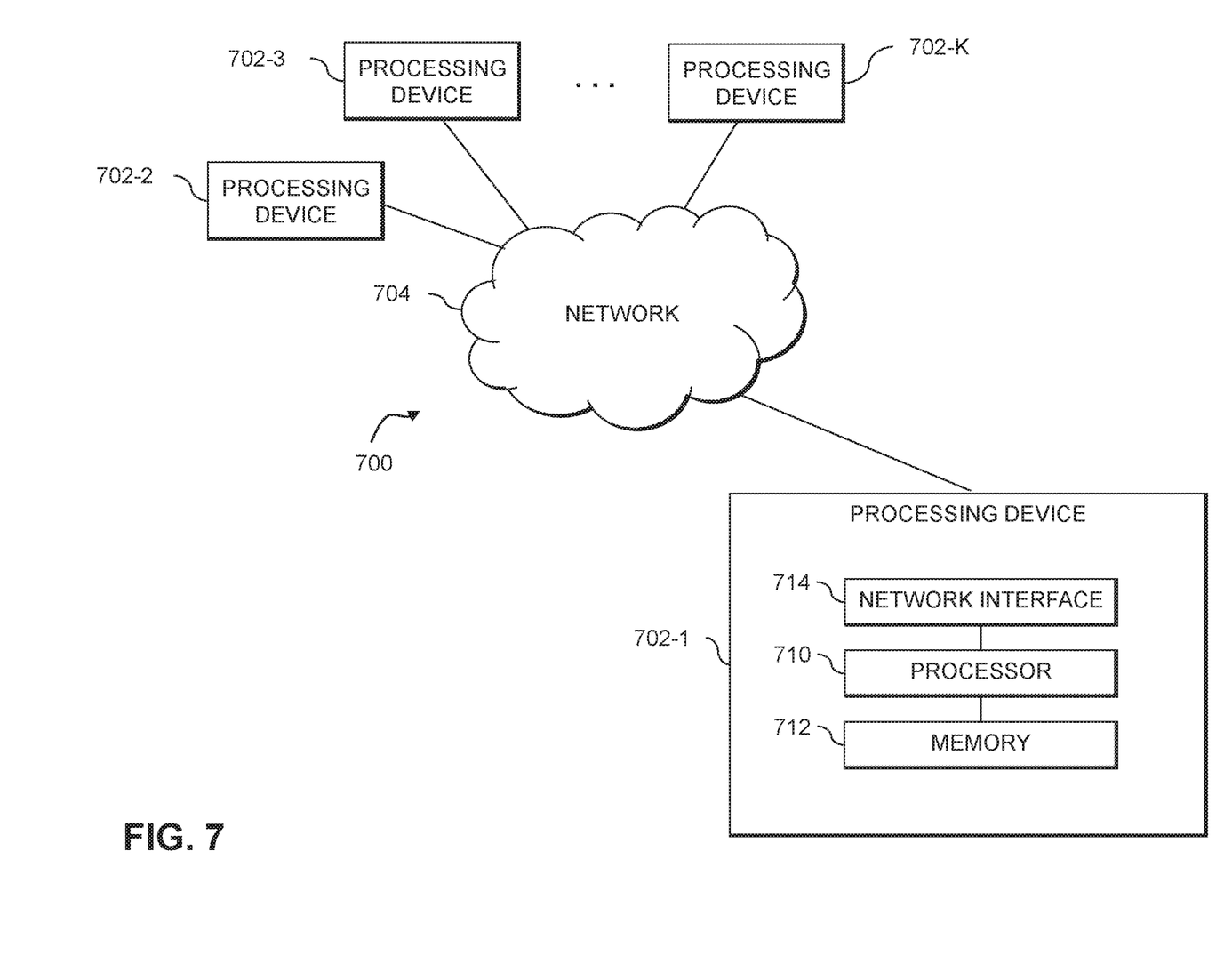

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an application-specific integrated circuit (ASIC), a field-programmable gate array (FPGA) or other type of processing circuitry, as well as portions or combinations of such circuitry elements.

The memory 712 comprises random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining historical performance data and historical capacity data pertaining to one or more storage objects within at least one storage system;
determining supervised datasets pertaining to security threat-related data and non-security threat-related data by processing at least a portion of the obtained historical performance data and historical capacity data using a first set of one or more artificial intelligence techniques, wherein the first set of one or more artificial intelligence techniques comprises at least one long short-term memory neural network comprising multiple hidden units, and wherein determining the supervised datasets comprises using the at least one long short-term memory neural network to determine multiple patterns, associated with multiple distinct intervals of time, in the at least a portion of the obtained historical performance data and historical capacity data;
configuring a second set of one or more artificial intelligence techniques based at least in part on the determined supervised datasets;
detecting one or more security threats in connection with at least one storage object within the at least one storage system by processing input data from the at least one storage object using the second set of one or more artificial intelligence techniques; and
performing at least one automated action based at least in part on the one or more detected security threats;
wherein the method is performed by at least one processing device comprising a processor coupled to a memory.

2. The computer-implemented method of claim 1, wherein determining the multiple patterns associated with multiple distinct intervals of time comprises determining, for each of one or more metrics within the at least a portion of the obtained historical performance data and historical capacity data, an upper bound value for non-security threat-related data and a lower bound value for non-security threat-related data.

3. The computer-implemented method of claim 1, wherein the one or more storage objects comprises one or more of at least one file system within the at least one storage system and at least one logical unit number within the at least one storage system.

4. The computer-implemented method of claim 1, wherein the second set of one or more artificial intelligence techniques comprises a machine learning model which uses at least one deep learning technique comprising a recurrent neural network, and wherein configuring the second set of one or more artificial intelligence techniques comprises learning one or more threat-related patterns in the determined supervised datasets based at least in part on a number of layers in the recurrent neural network.

5. The computer-implemented method of claim 1, wherein performing the at least one automated action comprises generating and outputting an alert regarding the one or more detected security threats to at least one entity associated with the at least one storage system.

6. The computer-implemented method of claim 1, wherein performing the at least one automated action comprises training the second set of one or more artificial intelligence techniques using at least a portion of the one or more detected security threats.

7. The computer-implemented method of claim 1, further comprising:
implementing a closed-loop feedback mechanism responsive to one or more conditions related to at least a portion of the one or more detected security threats.

8. The computer-implemented method of claim 1, wherein the historical performance data comprise data related to one or more of latency, input/output operations per second, bandwidth, central processing unit utilization, read percentage, and queue length.

9. The computer-implemented method of claim 1, wherein the input data comprise real-time performance data and real-time capacity data from the at least one storage object.

10. A non-transitory processor-readable storage medium having stored therein program code of one or more software programs, wherein the program code when executed by at least one processing device causes the at least one processing device:
to obtain historical performance data and historical capacity data pertaining to one or more storage objects within at least one storage system;
to determine supervised datasets pertaining to security threat-related data and non-security threat-related data by processing at least a portion of the obtained historical performance data and historical capacity data using a first set of one or more artificial intelligence techniques, wherein the first set of one or more artificial intelligence techniques comprises at least one long short-term memory neural network comprising multiple hidden units, and wherein determining the supervised datasets comprises using the at least one long short-term memory neural network to determine multiple patterns, associated with multiple distinct intervals of time, in the at least a portion of the obtained historical performance data and historical capacity data;
to configure a second set of one or more artificial intelligence techniques based at least in part on the determined supervised datasets;
to detect one or more security threats in connection with at least one storage object within the at least one storage system by processing input data from the at least one storage object using the second set of one or more artificial intelligence techniques; and
to perform at least one automated action based at least in part on the one or more detected security threats.

11. The non-transitory processor-readable storage medium of claim 10, wherein determining the multiple patterns associated with multiple distinct intervals of time comprise determining, for each of one or more metrics within the at least a portion of the obtained historical performance data and historical capacity data, an upper bound value for non-security threat-related data and a lower bound value for non-security threat-related data.

12. The non-transitory processor-readable storage medium of claim 10, wherein the one or more storage objects comprises one or more of at least one file system within the at least one storage system and at least one logical unit number within the at least one storage system.

13. The non-transitory processor-readable storage medium of claim 10, wherein the second set of one or more artificial intelligence techniques comprises a machine learning model which uses at least one deep learning technique comprising a recurrent neural network, and wherein configuring the second set of one or more artificial intelligence techniques comprises learning one or more threat-related patterns in the determined supervised datasets based at least in part on a number of layers in the recurrent neural network.

14. An apparatus comprising:
  at least one processing device comprising a processor coupled to a memory;
  the at least one processing device being configured:
    to obtain historical performance data and historical capacity data pertaining to one or more storage objects within at least one storage system;
    to determine supervised datasets pertaining to security threat-related data and non-security threat-related data by processing at least a portion of the obtained historical performance data and historical capacity data using a first set of one or more artificial intelligence techniques, wherein the first set of one or more artificial intelligence techniques comprises at least one long short-term memory neural network comprising multiple hidden units, and wherein determining the supervised datasets comprises using the at least one long short-term memory neural network to determine multiple patterns, associated with multiple distinct intervals of time, in the at least a portion of the obtained historical performance data and historical capacity data;
    to configure a second set of one or more artificial intelligence techniques based at least in part on the determined supervised datasets;
    to detect one or more security threats in connection with at least one storage object within the at least one storage system by processing input data from the at least one storage object using the second set of one or more artificial intelligence techniques; and
    to perform at least one automated action based at least in part on the one or more detected security threats.

15. The apparatus of claim 14, wherein determining the multiple patterns associated with multiple distinct intervals of time comprise determining, for each of one or more metrics within the at least a portion of the obtained historical performance data and historical capacity data, an upper bound value for non-security threat-related data and a lower bound value for non-security threat-related data.

16. The apparatus of claim 14, wherein the one or more storage objects comprises one or more of at least one file system within the at least one storage system and at least one logical unit number within the at least one storage system.

17. The apparatus of claim 14, wherein the second set of one or more artificial intelligence techniques comprises a machine learning model which uses at least one deep learning technique comprising a recurrent neural network, and wherein configuring the second set of one or more artificial intelligence techniques comprises learning one or more threat-related patterns in the determined supervised datasets based at least in part on a number of layers in the recurrent neural network.

18. The apparatus of claim 14, wherein performing the at least one automated action comprises generating and outputting an alert regarding the one or more detected security threats to at least one entity associated with the at least one storage system.

19. The apparatus of claim 14, wherein the historical performance data comprise data related to one or more of latency, input/output operations per second, bandwidth, central processing unit utilization, read percentage, and queue length.

20. The apparatus of claim 14, wherein the input data comprise real-time performance data and real-time capacity data from the at least one storage object.

* * * * *